United States Patent

Maemine

[11] Patent Number: 5,828,524
[45] Date of Patent: Oct. 27, 1998

[54] ROTARY HEAD ASSEMBLY WITH ANGULARLY DISPLACED HEADS

[75] Inventor: Kenji Maemine, Miyagi-ken, Japan

[73] Assignee: Alps Electric Co. Ltd., Tokyo, Japan

[21] Appl. No.: 706,472

[22] Filed: Sep. 4, 1996

[30] Foreign Application Priority Data

Sep. 18, 1995 [JP] Japan .................................. 7-263447

[51] Int. Cl.[6] .................................................. G11B 5/52
[52] U.S. Cl. ............................................................ 360/108
[58] Field of Search .............................................. 360/108

[56] References Cited

U.S. PATENT DOCUMENTS

| | | | |
|---|---|---|---|
| 5,142,422 | 8/1992 | Zook et al. | 360/54 |
| 5,325,248 | 6/1994 | Tabuchi | 360/108 |
| 5,363,263 | 11/1994 | Ohji | 360/108 |

Primary Examiner—A. J. Heinz
Attorney, Agent, or Firm—Brinks Hofer Gilson & Lione

[57] ABSTRACT

A magnetic read/write device comprises a rotary drum, a first write head disposed on the circumference of the rotary drum, a first read head disposed on the circumference of the rotary drum diametrically opposite to the first write head, a second write head disposed on the circumference of the rotary drum behind the first write head with respect to the rotating direction of the rotary drum, a second read head disposed on the circumference of the rotary drum behind the first read head with respect to the rotating direction of the rotary drum and diametrically opposite to the second write head, and a rotary transformer provided with a first write channel for transmitting signals to the first write head, a first read channel for transmitting signals from the first read head, a second read channel for transmitting signals from the second read head, and a second write channel for transmitting signals to the second write head concentrically arranged in that order.

10 Claims, 5 Drawing Sheets

ROTARY HEAD ASSEMBLY WITH ANGULARLY DISPLACED HEADS

BACKGROUND OF THE INVENTION

The present invention relates to a magnetic read/write device and, more specifically, to a magnetic read/write device capable of writing signals on a magnetic partially wrapping around a rotary drum and of reading recorded signals.

In a known helical scanning type magnetic read/write device, such as for video tape recorders or digital audio tape recorders, the storage capacity of a magnetic tape is used effectively by helically wrapping the magnetic tape around a rotary head cylinder to increase the length of recording tracks. However, in a magnetic read/write device provided with a plurality of write heads and a plurality of read heads, such as those of a four-head type, the plurality of magnetic heads come simultaneously into contact with the magnetic tape and function simultaneously due to restrictions on the arrangement of the magnetic heads when the wrapping angle of the magnetic tape wrapping around a head cylinder is large and, consequently, crosstalk between the magnetic heads occurs.

Figure 7:
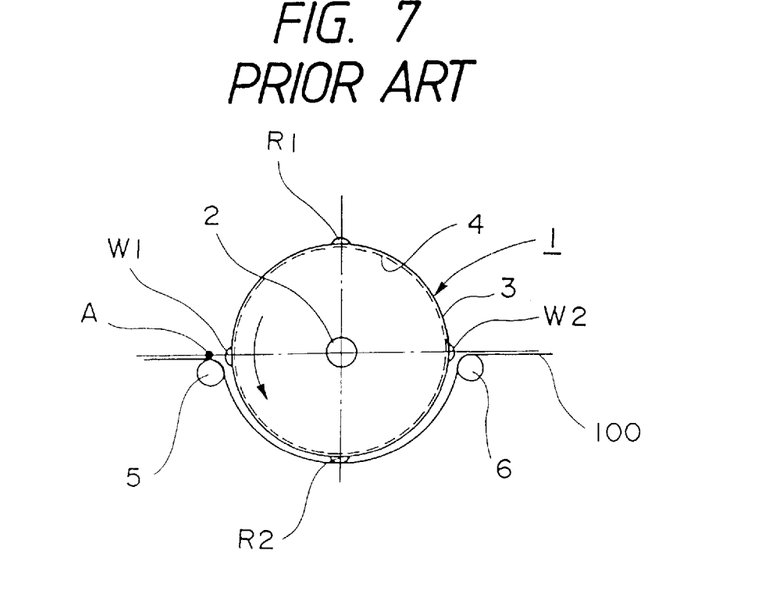
FIG. 7 is a schematic plan view of a prior art magnetic read/write device.
Figure 8:
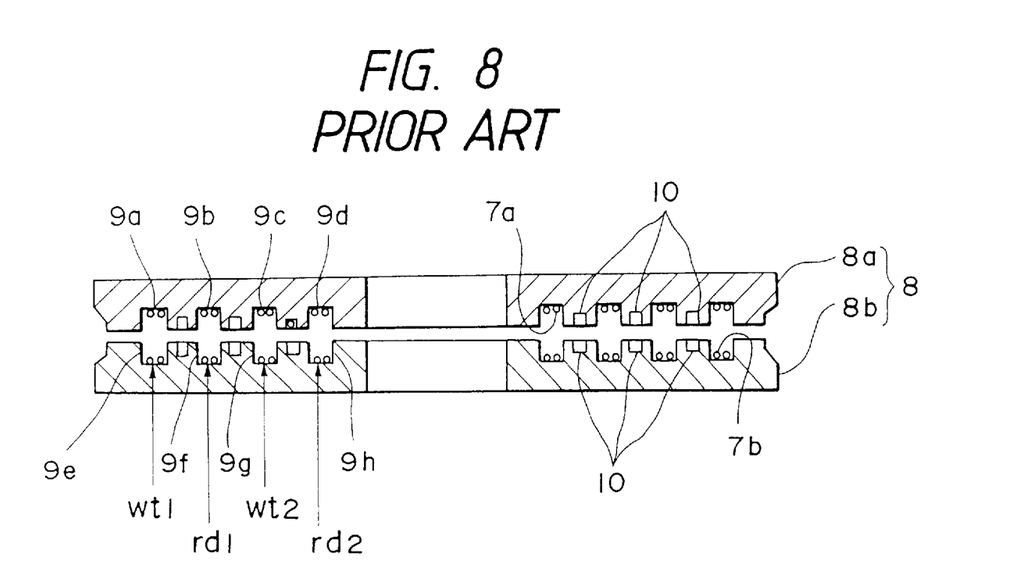
FIG. 8 is a longitudinal sectional view of a rotary transformer included in the magnetic read/write device of FIG. 7.
Figure 9:
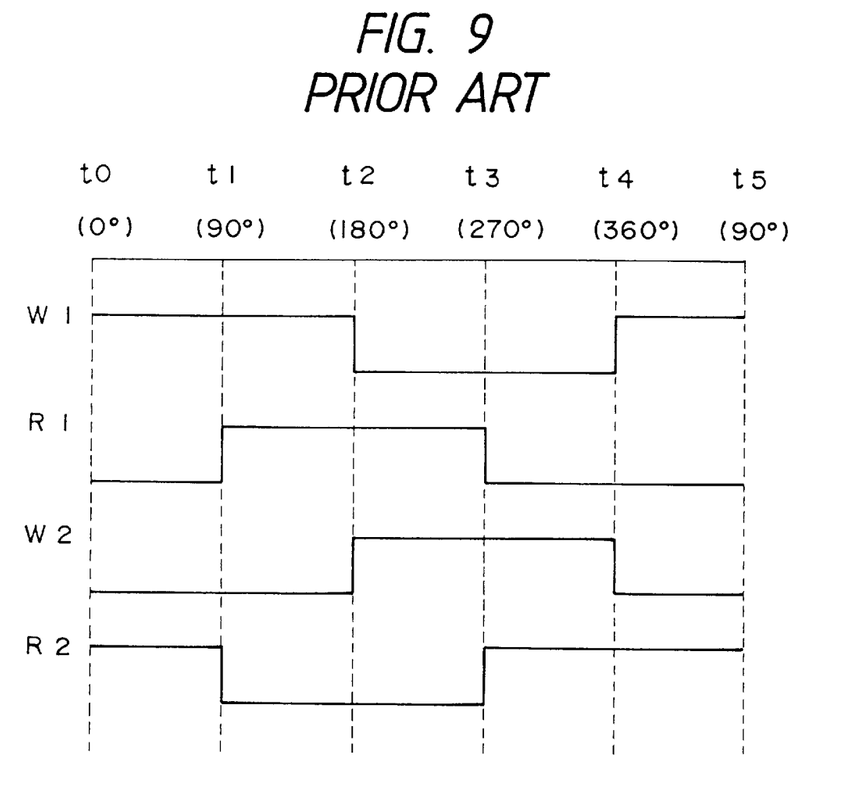
FIG. 9 is a timing chart of assistance in explaining the write operation of the magnetic read/write device of FIG. 7.

A known magnetic read/write device records signals and, at the same time, reads recorded signals for monitoring to ensure accurate signal recording. A known magnetic read/write device 1 of such a type will be described with reference to FIGS. 7 to 9. FIG. 7 shows the placement of magnetic heads in the known magnetic read/write device 1, FIG. 8 is a sectional view of a rotary transformer 8 included in the magnetic read/write device 1, and FIG. 9 is a timing chart of assistance in explaining the write operation of the magnetic read/write device 1. The magnetic read/write device 1 has a rotating shaft 2, a rotary drum 3 coaxially mounted on the rotating shaft 2, and a stationary drum 4 for supporting the rotating shaft 2 for rotation, indicated by broken lines. The rotating shaft 2 is tilted at a predetermined angle to a base, and the stationary drum 4 is fixed to the base. The rotating shaft 2 is operatively connected to a driving motor, not shown. The driving motor drives the rotating shaft 2, and hence the rotary drum 3 fixed to the rotating shaft 2, for high-speed counterclockwise rotation. The rotary transformer 8 has a stator transformer 8b fixed to the stationary drum 4 and a rotor transformer 8a fixed to the rotary drum 3 opposite to the stator transformer 8b. Concentric circular grooves 9a, 9b, 9c and 9d are formed in a surface of the rotor transformer 8a facing the stator transformer 8b, and concentric circular grooves 9e, 9f, 9g and 9h are formed in the surface of the stator transformer 8b facing the rotor transformer 8a. A coil 7a is embedded in the grooves 9a to 9d, and a coil 7b is embedded in the grooves 9e to 9h to construct a magnetic circuit, and to form two write channels wt1 and wt2 and two read channels rd1 and rd2.

The coil 7b on the stator transformer 8b is connected to an unillustrated control circuit included in the magnetic read/write device to exchange signals therebetween. Two write heads W1 and W2 and two read heads R1 and R2 are attached to the circumference of the rotary drum 3. The heads W1, W2, R1 and R2 are connected to the coil 7a on the rotor transformer 8a to exchange signals between the heads W1, W2, R1 and R2, and the coil 7a. The channels wt1, rd1, wt2 and rd2 are arranged in that order in a direction from the outermost grooves 9a and 9e toward the innermost grooves 9d and 9h. The first write head W1 and the second write head W2 are diametrically opposite to each other with respect to the rotating shaft 2. The first read head R1 and the second read head R2 are diametrically opposite to each other with respect to the rotating shaft 2, and positioned 90° behind the first write head W1 and the second write head W2, respectively, with respect to the rotating direction of the rotary drum 3.

Tape guides 5 and 6 are disposed near the circumference of the rotary drum 3 on the base of the magnetic read/write device 1. A magnetic tape 100 unwound from a feed reel is transported from the left to the right, as viewed in FIG. 7, guided by the tape guides 5 and 6 so as to wrap around the circumference of the rotary drum 3, transported to the right by a tape transporting mechanism including a pinch roller and a capstan, and is taken up by a take-up reel.

The signal writing operation of the magnetic read/write device will be described hereinafter. The rotary drum 3 rotates counterclockwise at a high rotating speed relative to the magnetic tape 100 wrapped around the circumference of the rotary drum 3, and the control circuit, not shown selectively actuates the heads and exchanges signals with the heads. The write head W1 or W2 writes signals on tracks on the magnetic tape 100, and the read head R1 or R2 scans the tracks to read the recorded signals.

The signal writing operation will be described with reference to a timing chart shown in FIG. 9, in which parenthesized values are angular positions of a reference point on the rotary drum 3 with respect to a starting point A at corresponding times, respectively, and each head is active when the signal is HIGH and inactive when LOW.

The first write head W1, the second read head R2 and the second write head W2 are in engagement with the magnetic tape 100 and the first read head R1 is disengaged from the magnetic tape 100 at time t0.

In a period between times t0 and t1, i.e., a period in which the rotary drum 3 turns through 90° from the starting point A to a 90°-position, the first write head W1 and the second read head R2 are active to write signals by the first write head W1 on a track on the magnetic surface of the magnetic tape 100 and to read the signals on a preceding track by the second read head R2 for monitoring, and the first read head R1 and the second write head W2 remain inactive.

In a period between times t1 and t2, i.e., a period in which the rotary drum 3 turns through an angle between a 90°-position and a 180°-position, the first write head W1 and the first read head R1 are active, to write signals on a track by the first write head W1 and to read signals written by the first write head W1 in the period between time to and t1 for monitoring, and the second read head R2 and the second write head W2 remain inactive.

In a period between times t2 and t3, i.e., a period in which the rotary drum 3 turns through an angle between the 180°-position and a 270°-position, the second write head W2 and the first read head R1 are active to write signals on a track by the second write head W2 and to read the signals written by the first write head W1 in the period between times t1 and t2, and the second read head R2 and the first write head W1 remain inactive.

In a period between times t3 and t4, i.e., a period in which the rotary drum 3 turns through an angle between the 270°-position and a 360°-position, the second write head W2 and the second read head R2 are active to write signals on a track by the second write head W2 and to read the signals written by the second write head W2 in the period between times t2 and t3 by the second write head W2 by the second read head R2 for monitoring, and the first read head R1 and the second write head W2 remain inactive.

The tracks thus formed by the write heads by those write operations are scanned by the subsequent read heads for monitoring. When faults are found in the written signals, the signals are written again.

The write heads and the read heads of this prior art magnetic read/write device operate simultaneously. Accordingly, crosstalk occurs sometimes due to the leakage of signal currents from the active channels to the adjacent active channels of the rotary transformer 8. Generally, the intensity of read signals is lower than that of write signals and, therefore, the adverse effect of crosstalk on the read channel among the neighboring read channel and the write channel is more significant and hence read errors are liable to occur.

Short rings 10 are disposed between the adjacent channels of the rotary transformer 8 to shield the channels from noise as shown in FIG. 8. Short rings operate as magnetic shields to prevent noise interference between adjacent channels. However, the use of the short rings 10 inevitably increases the diameter of the rotary transformer 8 to make the miniaturization of the magnetic read/write device difficult.

Another known magnetic read/write device is provided with a write head having two recording gaps, and a read head having two reproducing gaps disposed diametrically opposite to each other on a rotary cylinder. In the write and read operations of this magnetic read/write device, the wrapping angle of the magnetic tape is not greater than 180° and the write head and the read head are not simultaneously active. The special magnetic heads having two gaps is more expensive than ordinary magnetic heads having a single gap.

SUMMARY OF THE INVENTION

The present invention has been made in view of the foregoing problems in the prior art and it is therefore a first object of the present invention to provide a magnetic read/write device capable of suppressing crosstalk and having a structure suitable for miniaturization.

A second object of the present invention is to provide a magnetic read/write device capable of suppressing crosstalk and of effectively using the storage capacity of magnetic tapes.

A third object of the present invention is to provide a magnetic read/write device capable of suppressing crosstalk and of writing and reading signals with high reliability.

A fourth object of the present invention is to provide a magnetic read/write device capable of suppressing crosstalk, of writing and reading signals with high reliability and of being manufactured at a low cost.

According to a first aspect of the present invention, a magnetic read/write device comprises: a rotary drum; a first write head disposed on the circumference of the rotary drum; a first read head disposed on the circumference of the rotary drum diametrically opposite to the first write head; a second write head disposed on the circumference of the rotary drum behind the first write head with respect to the rotating direction of the rotary drum; a second read head disposed on the circumference of the rotary drum behind the first read head with respect to the rotating direction of the rotary drum and diametrically opposite to the second write head; and a rotary transformer provided with a first write channel for transmitting signals to the first write head, a first read channel for transmitting signals from the first read head, a second read channel for transmitting signals from the second read head, and a second write channel for transmitting signals to the second write head concentrically arranged in that order.

This magnetic read/write device is capable of suppressing crosstalk without using any short ring and hence the magnetic read/write device can easily be miniaturized.

According to a second aspect of the present invention, a magnetic read/write device comprises: a rotary drum; a first write head disposed on the circumference of the rotary drum; a first read head disposed on the circumference of the rotary drum diametrically opposite to the first write head; a second write head disposed on the circumference of the rotary drum behind the first write head with respect to the rotating direction of the rotary drum; a second read head disposed on the circumference of the rotary drum behind the first read head with respect to the rotating direction of the rotary drum and diametrically opposite to the second write head; and a rotary transformer provided with a first read channel for transmitting signals from the first read head, a first write channel for transmitting signals to the first write head, a second write channel for transmitting signals to the second write head, and a second read channel for transmitting signals from the second read head concentrically arranged in that order.

This magnetic read/write device is capable of suppressing crosstalk without using any short ring and hence the magnetic read/write device can easily be miniaturized.

In the magnetic read/write device according to the first or the second aspect of the present invention, the rotary transformer may be provided with short rings only between the adjacent channels excluding the outermost channel and the innermost channel.

This magnetic read/write device employs only two short ring and hence can easily be miniaturized.

In the magnetic read/write device according to the first or the second aspect of the present invention, a magnetic tape is wrapped around the rotary drum so that the wrapping angle of the magnetic tape is in the range of 90° to 180°.

This magnetic read/write device suppresses crosstalk and is capable of effectively using the storage capacity of the magnetic tape.

In the magnetic read/write device according to the first or the second aspect of the present invention, the first write head forms first recording tracks on the magnetic tape wrapped around the rotary drum, the second write head forms second recording tracks on the magnetic tape wrapped around the rotary drum, the first read head reads the first recording tracks, and the second read head reads the second recording tracks.

This magnetic read/write device is capable of suppressing crosstalk, is capable of reading and writing signals with high reliability and can be manufactured at a low cost.

In the magnetic read/write device according to the first or the second aspect of the present invention, each of the first write head, the second write head, the first read head and the second read head may be provided with a single magnetic gap.

This magnetic read/write device is capable of suppressing crosstalk, is capable of reading and writing signals with high reliability and can be manufactured at a low cost.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

A magnetic read/write device in a first embodiment according to the present invention will be described hereinafter with reference to FIGS. 1 to 4 and Table 1 showing the conditions of channels of a rotary transformer included in the magnetic read/write device during a read operation.

Figure 1:
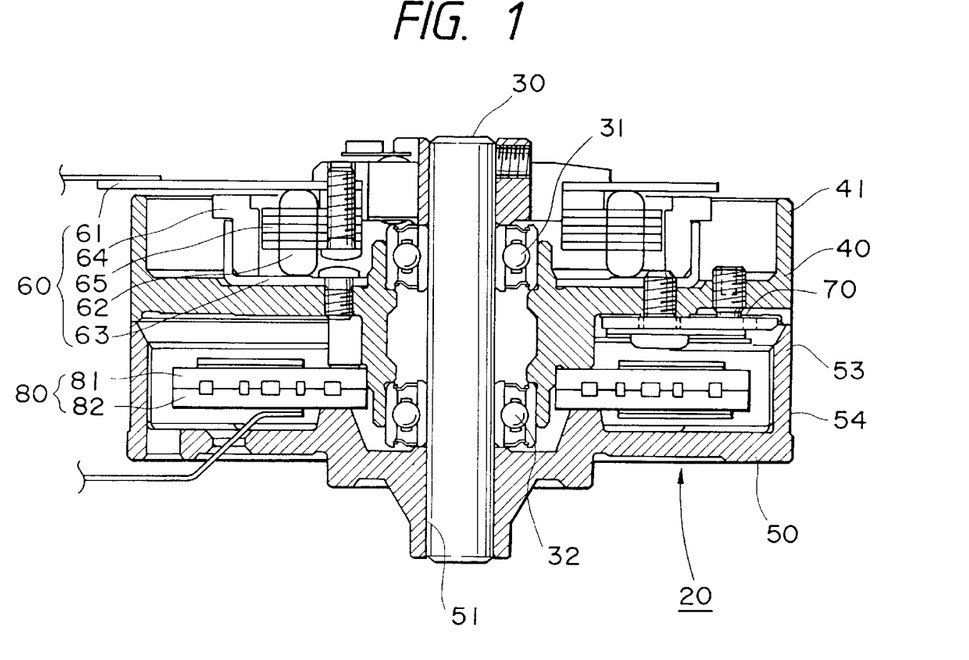
FIG. 1 is a longitudinal sectional view of a magnetic read/write device in a first embodiment according to the present invention.

Referring to FIG. 1 showing a magnetic read/write device 20 in the first embodiment, the inner rings of ball bearings 31 and 32 are fixedly put on a shaft 30, and a cylindrical rotary drum 40 is fixedly put on the outer rings of the ball bearings 31 and 32 for rotation on the shaft 30. The rotary drum 40 is integrally provided with an annular side wall 41, and a driving motor 60 is disposed in a space surrounded by the annular side wall 41. A lower end portion of the shaft 30 is fixedly pressed in a bore 51 formed in a cylindrical stationary drum 50. The stationary drum 50 is fixed to a base, not shown, with screws or the like so that the shaft 30 is tilted at a predetermined angle to a magnetic tape transporting direction. The stationary drum 50 is integrally provided with an annular side wall 53, and a helical groove 54 inclined at a predetermined angle to the axis of rotation is formed in the outer circumference of the annular side wall 53. A magnetic tape is wrapped around the helical groove 54. A rotary transformer 80 having a rotor transformer 81 and a stator transformer 82 is disposed in a space surrounded by the annular side wall 53 of the stationary drum 50.

The driving motor 60 comprises a wiring board 61, a stator yoke 62 fixed to the wiring board 61, a rotor yoke 63 fastened to the upper surface of the rotary drum 40 with screws, a multipolar permanent magnet 64 fixed to the rotor yoke 63 forming a magnetic circuit between the stator yoke 62 and the rotor yoke 63, and driving coils 65 held on the wiring board 61 opposite to the permanent magnet 64. The wiring board is connected to a control circuit, not shown, by a flexible printed wiring board. A driving current supplied from the control circuit through the flexible printed wiring board to the printed wiring board 61 is distributed sequentially to the driving coils 65 in a driving phase to generate a torque to drive the rotor yoke 63 provided with the multipolar permanent magnet 64. Thus, the rotary drum 40 is driven for rotation through the rotor yoke 63 on the shaft 30.

Figure 2:
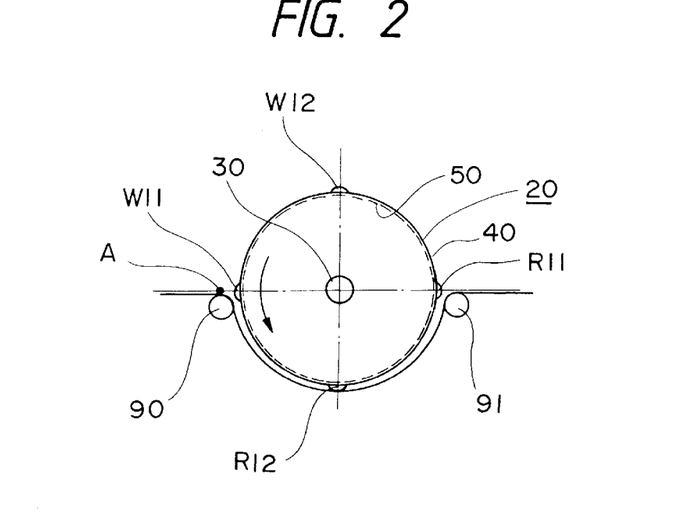
FIG. 2 is a schematic plan view of the magnetic read/write device of FIG. 1.

The placement of magnetic heads on the rotary drum 40 will be described with reference to FIG. 2. Two write heads W11 and W12 and two read heads R11 and R12 are fixed to a lower section 70 of the rotary drum 40 with their cores slightly protruded from the outer circumference of the rotary drum 40. The write heads W11 and W12 and the read heads R11 and R12 are ordinary magnetic heads having a single gap. The write heads W11 and W12 and the read heads R11 and R12 are connected to coils corresponding to channels formed in the rotor transformer 81 of the rotary transformer 80, respectively by a printed flexible wiring board.

The first write head W11 and the first read head R11 are disposed diametrically opposite to each other, and the second write head W12 and the second read head R12 are disposed diametrically opposite to each other and 90° behind the first write head W11 and the first read head R11, respectively, with respect to the rotating direction of the rotary drum 40.

Tape guides 90 and 91 are supported in the base of the magnetic read/write device 20 at positions near the outer circumference of the rotary drum 40. A magnetic tape 100 fed from the side of a feed reel is guided by the tape guides 90 and 91 so as to wrap around the helical groove 54 of the stationary drum 50 and the outer circumference of the rotary drum 40 and so that the recording surface thereof is scanned by the write heads W11 and W12 and the read heads R11 and R12. The magnetic tape 100 is transported toward a take-up reel on the side of the tape guide 91 and taken up on the take-up reel.

Figure 3:
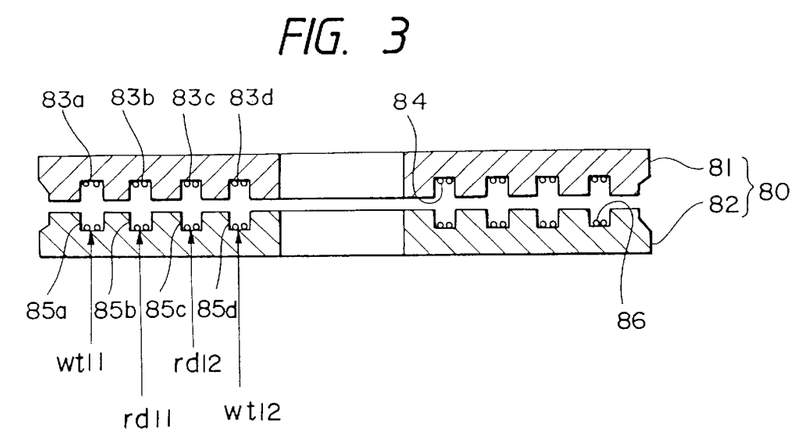
FIG. 3 is a longitudinal sectional view of a rotary transformer included in the magnetic read/write device of FIG. 1.

The arrangement of the channels of the rotary transformer 80 will be described with reference to FIG. 3. The rotary transformer 80 comprises the rotor transformer 81 which rotates together with the rotary drum 40, and the stator transformer 82 fixed to the stationary drum 50. The rotor transformer 81 has a disk-shaped core provided with a center opening and concentric circular grooves 83a, 83b, 83c and 83d, and coils 84 embedded in the circular grooves 83a, 83b, 83c and 83d. The coils 84 are connected to the corresponding write heads W11 and W12 and read heads R11 and R12, respectively, by a flexible printed wiring board, not shown, to exchange signals between the coils 84 and the write heads W11 and W12 and the read head R11 and R12.

The stator transformer 82 has a disk-shaped core provided with a center opening and concentric circular grooves 85a, 85b, 85c and 85d, and coils 86 embedded in the circular grooves 85a, 85b, 85c and 85d. The coils 86 are connected to a control circuit, not shown, included in the magnetic read/write device 20 by a flexible printed wiring board, not shown, to exchange signals between the coils 86 and the control circuit. The circular grooves 85a, 85b, 85c and 85d correspond to the circular grooves 83a, 83b, 83c and 83d, respectively.

The The rotor transformer 81 and the stator transformer 82 are disposed one over the other with the surfaces thereof provided with the coils 84 and 86 facing each other to form a magnetic circuit, two write channels wt11 and wt12 and two read channels rd11 and rd12.

The first write channel wt11 is formed by embedding the coil 84 connected to the first write head W11 in the outermost circular groove 83a and embedding the coil 86 in the outermost circular groove 85a. The first read channel rd11 is formed by embedding the coil 84 connected to the first read head R11 in the circular groove 83b and embedding the coil 86 in the circular groove 85b. The second read channel rd12 is formed by embedding the coil 84 connected to the second read head R12 in the circular groove 83c and embedding the coil 86 in the circular groove 85c. The second write channel wt12 is formed by embedding the coil 84 connected to the second write head W12 in the innermost circular groove 83d and embedding the coil 86 in the innermost circular groove 85d. Thus, the channels wt11, rd11, rd12 and wt12 are arranged in that order from the outer circumference toward the inner circumference of the rotary transformer 80. The channels wt11, rd11, rd12 and wt12 may be arranged in that order.

Although the magnetic read/write device 20 in this embodiment is provided with the rotary transformer 80 of an opposed-disk type, the present invention is not limited thereto; the magnetic read/write device 20 may be provided with a cylindrical rotary transformer, in which channels wt11, rd11, rd12 and wt12 may axially be arranged in that order from one end toward the other end of the axis of rotation of the cylindrical rotary transformer at positions at substantially equal radial distance from the axis of rotation.

Figure 4:
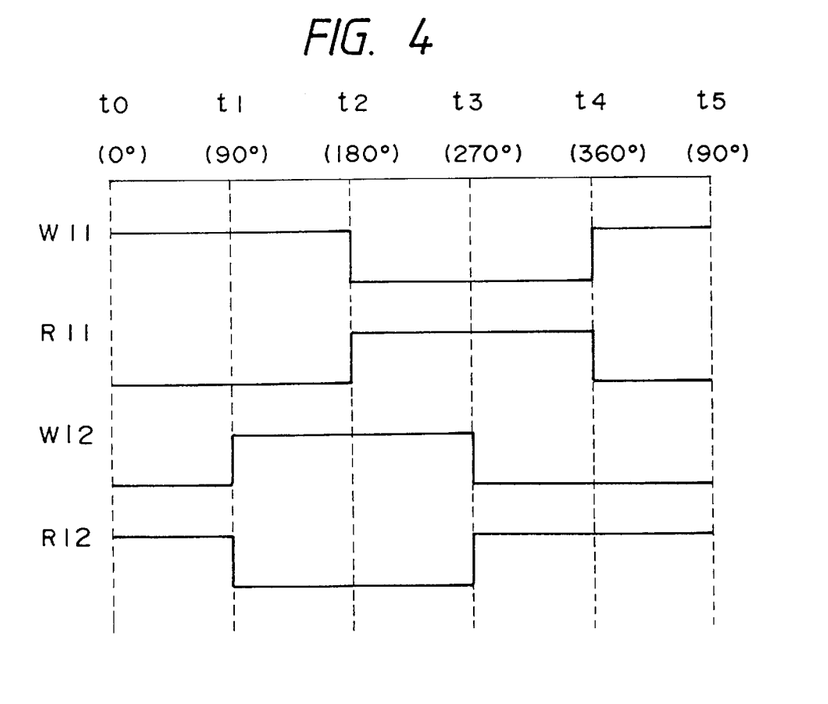
FIG. 4 is a timing chart of assistance in explaining the write operation of the magnetic read/write device of FIG. 1.

The write operation of the magnetic read/write device 20 will be described with reference to FIG. 4 and Table 1. FIG. 4 is a timing chart showing the variation of the operating condition of the write heads W11 and W12 and the read head R11 and R12 with time (t), in which parenthesized values are angular positions of a reference point on the rotary drum 3 with respect to a starting point A at corresponding times, respectively, and each head is active when the signal is HIGH and inactive when LOW. Table 1 shows the operating condition of the channels of the rotary transformer 80 in different periods in the write operation in which blank circles indicate that the corresponding channels are active, and blank spaces (no mark) indicate that the corresponding channels are inactive.

TABLE 1

○: Active   Blank: Inactive

| Periods | Channels | | | |
|---|---|---|---|---|
| | wt11 | rd11 | rd12 | wt12 |
| t0–t1 | ○ | | ○ | |
| t1–t2 | ○ | | | ○ |
| t2–t3 | | ○ | | ○ |
| t3–t4 | | ○ | ○ | |
| t4–t5 | ○ | | ○ | |

The first write head W11, the second read head R12 and the first read head R11 are engaged with the magnetic tape 100 and the second write head W12 is disengaged from the magnetic tape 100 at time t0.

The control circuit, not shown, activates the first write channel wt11 and the second read channel rd12 of the rotary transformer 80 and keeps the first read channel rd11 and the second write channel wt12 inactive in a period from time t0 to time t1, i.e., a period in which the rotary drum 40 turns through 90° from a 0°-position corresponding to the starting point A to a 90°-position. Consequently, the first write head W11 and the second read head R12 become operative. The first write head W11 writes signals on a track and the second read head R12 reads signals from a preceding track for monitoring. The first read head R11 and the second write head W12 remain inoperative.

The first write channel wt11 and the second write channel wt12 of the rotary transformer 80 are active and the first read channel rd11 and the second read channel rd12 of the same between the first write channel wt11 and the second write channel wt12 are inactive in a period from time t1 to time t2, i.e., a period in which the rotary drum 40 turns from the 90°-position to a 180°-position. Consequently, the first write head W11 and the second write head W12 become operative to write signals to tracks, and the first read head R11 and the second read head R12 remain inoperative.

The first read channel rd11 and the second write channel wt12 of the rotary transformer 80 are active and the second read channel rd12 between the first read channel rd11 and the second write channel wt12, and the first write channel wt11 are inactive in a period from time t2 to t3, i.e., a period in which the rotary drum 40 turns from the 180°-position to a 270°-position. Consequently, the second write head W12 and the first read head R11 are operative. The second write head W12 writes signals to a track and, at the same time, the first read head R11 reads the signals written by the first write head W11 in the period from time t0 to time t1 for monitoring. The second read head R12 and the first write head W11 remain inoperative.

The first read channel rd11 and the second read channel rd12 of the rotary transformer 80 are activated first write channel wt11 and the second write channel wt12 of the same are kept inactive in a period from time t3 to time t4, i.e., a period in which the rotary drum 40 turns from the 270°-position to a 360°-position. Consequently, the first read head R11 and the second read head R12 become operative. The first read head R11 reads the signals written by the first write head W11 in the period from time t1 to time t2 for monitoring, and the second read head R12 reads the signals written by the second write head W12 in the period from time t1 to time t2 for monitoring. The first write head W11 and the second write head W12 remain inoperative.

The first write channel wt11 and the second read channel rd12 of the rotary transformer 80 are activated and the first read channel rd11 between the first write channel wt11 and the second read channel rd12, and the second write channel wt12 are kept inactive in a period from time t4 to t5, i.e., a period in which the rotary drum 40 turns through 90° again from the 0°-position corresponding to the starting point A. Consequently, the first write head W11 and the second read head R12 are operative. The first write head W11 write signals to a track and, at the same time, the second read head R12 reads the signals written by the second write head W12 in the period from time t2 to time t3 for monitoring.

During the write operation, the tracks formed by the write heads W11 and W12 are scanned subsequently by the read heads R11 and R12 to monitor the written signals. If any faults are found in the written signals the corresponding signals are written again.

As mentioned above in connection with the description of the write operation, in this magnetic read/write device 20 of the present invention, two heads among the write heads W11 and W12 and the read heads R11 and R12 are operative at any moment during the write operation. Since one of the inactive channels exists between the active channels, the active channels are spaced a sufficient distance apart and hence crosstalk between the active channels rarely occurs. Although no inactive channel exists between the first read channel rd11 and the second read channel rd12 in the period between time t3 and time t4, crosstalk between the read channels is insignificant because the intensity of reproduced signals is low.

Since the magnetic read/write device 20 has such a configuration effective in suppressing crosstalk, the magnetic read/write device 20 does not need any short ring and can be miniaturized.

The magnetic heads employed in the magnetic read/write device 20 are those of the inexpensive ordinary type having only one gap. Therefore the magnetic read/write device need not employ expensive magnetic heads.

The monitoring read operation performed simultaneously with the write operation ensures highly reliable signal recording.

Figure 5:
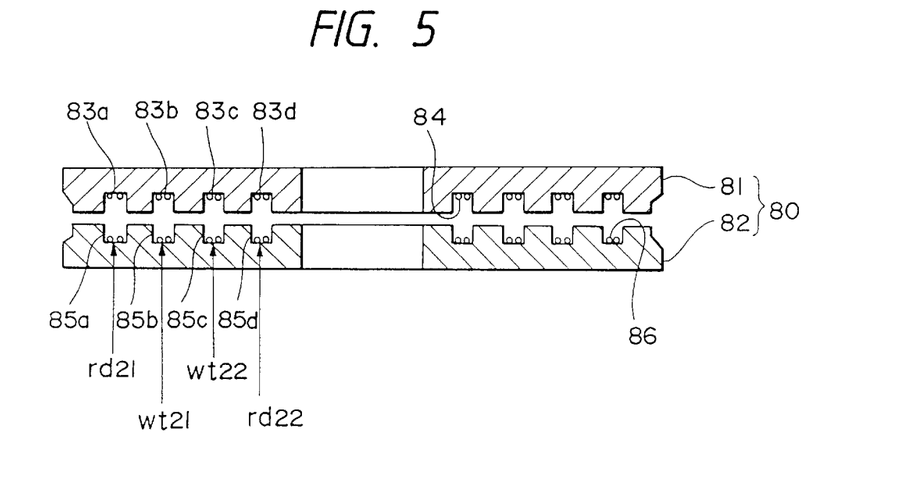
FIG. 5 is a longitudinal sectional view of a rotary transformer included in a magnetic read/write device in a second embodiment according to the present invention.

A magnetic read/write device in a second embodiment according to the present invention will be described hereinafter with reference to FIG. 5 and Table 2, in which parts like or corresponding to those of the first embodiment are designated by the same reference characters and the description thereof will be omitted. FIG. 5 is a sectional view of a rotary transformer employed in the magnetic read/write device in the second embodiment. Table 2 shows the operating condition of the channels of the rotary transformer in different periods in the write operation, in which blank circles indicate that the corresponding channels are active, and blank spaces (no mark) indicate that the corresponding channels are inactive.

TABLE 2

○: Active    Blank: Inactive

| Periods | rd21 | wt21 | wt22 | rd22 |
|---------|------|------|------|------|
| t0–t1   |      | ○    |      | ○    |
| t1–t2   |      | ○    | ○    |      |
| t2–t3   | ○    |      | ○    |      |
| t3–t4   | ○    |      |      | ○    |
| t4–t5   |      | ○    |      | ○    |

The magnetic read/write device in the second embodiment differs from that in the first embodiment in the placement of the channels of a rotary transformer 80 employed therein and is the same as the latter in other respects including the arrangement of read heads and write heads. A coil 84 connected to a first read head R11 is embedded in an outermost circular groove 83a and a coil 86 is embedded in a corresponding circular groove 85a to form a first read channel rd21, a coil 84 connected to a second write head W11 is embedded in a circular groove 83b adjacent to the circular groove 83a and a coil 86 is embedded in a corresponding circular groove 85b to form a first write channel wt21, a coil connected to a second write head W12 is embedded in a circular groove 83c and a coil 86 is embedded in a corresponding circular groove 85c to form a second write channel wt22, and coil 84 connected to a read head R12 is embedded in a circular groove 83d and a coil 86 is embedded in a circular groove 85d to form a second read channel rd22. Thus, the channels rd21, wt21, wt22 and rd22 are arranged in that order from the outer circumference toward the inner circumference of the rotary transformer 80. The channels rd21, wt21, wt22 and rd22 may be arranged in that order from the inner circumference toward the outer circumference of the rotary transformer 80.

Although the magnetic read/write device in this embodiment is provided with the rotary transformer 80 of an opposed-disk type, the present invention is not limited thereto; the magnetic read/write device may be provided with a cylindrical rotary transformer, in which channels rd21, wt21, wt22 and rd22 may axially be arranged in that order from one end toward the other end of the axis of rotation of the cylindrical rotary transformer at positions at substantially equal radial distance from the axis of rotation.

The write operation of the magnetic read/write device in the second embodiment will be described with reference to FIG. 5 and Table 2. The first write head W11, the second read head R12 and the first read head R11 engaged with a magnetic tape 100 and the second write head W12 is disengaged from the magnetic tape 100 at time t0.

A control circuit, not shown, activates the first write channel wt21 and the second read channel rd22 of the rotary transformer 80 and keeps the second read channel rd22 and the second write channel wt22 formed between the first write channel wt21 and the second read channel rd22, and the first read channel rd21 inactive in a period from time t0 to time t1, i.e., a period in which the rotary drum 40 turns through 90° from a 0°-position corresponding to a starting point A to a 90°-position. Consequently, the first write head W11 and the second read head R12 become operative. The first write head W11 writes signals to a track on the recording surface of the magnetic tape 100 and, at the same time, the second read head R12 reads signals from a preceding track for monitoring. The first read head R11 and the second write head W12 remain inoperative.

The first write channel wt21 and the second write channel wt22 of the rotary transformer 80 are active and the first read channel rd21 and the second read channel rd22 of the same are inactive in a period from time t1 to time t2, i.e., a period in which the rotary drum 40 turns from the 90°-position to a 180°-position. Consequently, the first write head W11 and the second write head W12 become operative to write signals to tracks, and the first read head R11 and the second read head R12 remain inoperative.

The first read channel rd21 and the second write channel wt22 of the rotary transformer 80 are active and the first write channel wt21 between the first read channel rd21 and the second write channel wt22, and the second read channel rd22 are inactive in a period from time t2 to t3, i.e., a period in which the rotary drum 40 turns from the 180°-position to a 270°-position. Consequently, the second write head W12 and the first read head R11 are operative. The second write head W12 writes signals to a track and, at the same time, the first read head R11 reads the signals written by the first write head W11 in the period from time t0 to time t1 for monitoring. The second read head R12 and the first write head W11 remain inoperative.

The first read channel rd21 and the second read channel rd22 of the rotary transformer 80 are activated and the first write channel wt21 and the second write channel wt22 of the same are kept inactive in a period from time t3 to time t4, i.e., a period in which the rotary drum 40 turns from the 270°-position to a 360°-position. Consequently, the first read head R11 and the second read head R12 become operative. The first read head R11 reads the signals written by the first write head W11 in the period from time t1 to time t2 for monitoring, and the second read head R12 reads the signals written by the second write head W12 in the period from time t1 to time t2 for monitoring. The first write head W11 and the second write head W12 remain inoperative.

The first write channel wt21 and the second read channel rd22 of the rotary transformer 80 are activated and the second write channel wt22 between the first write channel wt21 and the second read channel rd22, and the first read channel rd21 are kept inactive in a period from time t4 to time t5, i.e., a period in which the rotary drum 40 turns through 90° again from the 0°-position corresponding to the starting point A. Consequently, the first write head W11 and the second read head R12 are operative. The first write head W11 write signals to a track and, at the same time, the second read head R12 reads the signals written by the second write head W12 in the period from time t2 to time t3 for monitoring.

During the write operation, the tracks formed by the write heads W11 and W12 are scanned subsequently by the read heads R11 and R12 to monitor the written signals. If any faults are found in the written signals the corresponding signals are written again.

As mentioned above in connection with the description of the write operation, in this magnetic read/write device of the present invention, since one of the inactive channels exists between the two active channels, the active channels are spaced a sufficient distance apart and hence crosstalk between the active channels rarely occurs. Although no inactive channel exists between the first write channel wt21 and the second write channel wt22 in the period between time t1 and time t2, crosstalk between the write channels wt21 and wt22 can be suppressed by increasing only the interval between the write channels wt21 and wt22. It is important to suppress the cross talk of recording signals to reproduced signals because the intensity of reproduced signals is far lower than that of recording signals. The magnetic read/write device in the second embodiment is able to operate at a low error rate.

Since the magnetic read/write device in the second embodiment has such a configuration effective in suppressing crosstalk, the magnetic read/write device does not need any short ring and can be miniaturized.

The magnetic heads employed in the magnetic read/write device are those of the inexpensive ordinary type having only one gap. Therefore the magnetic read/write device need not employ expensive magnetic heads.

The monitoring read operation performed simultaneously with the write operation ensures highly reliable signal recording.

A magnetic read/write device in a modification of the magnetic read/write device in the second embodiment will be described hereinafter with reference to FIG. 6, in which parts like or corresponding to those of the second embodiment are designated by the same reference characters and the description thereof will be omitted.

Figure 6:
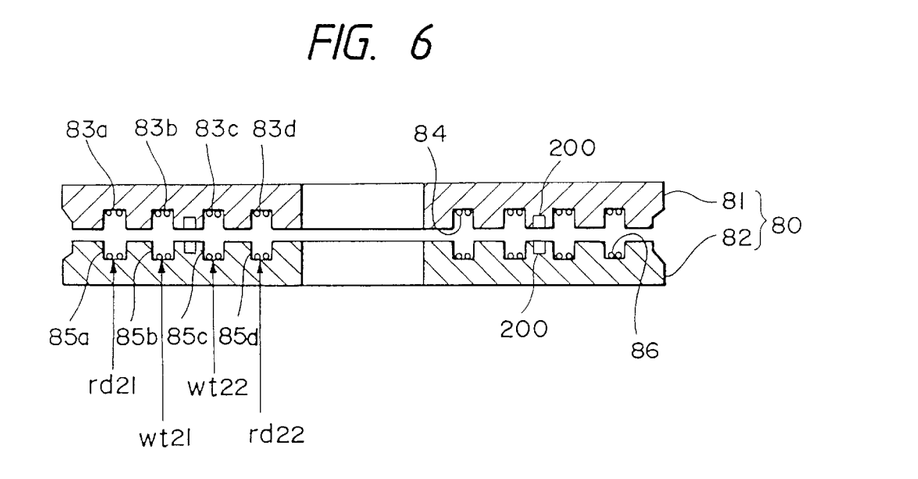
FIG. 6 is a longitudinal sectional view of a rotary transformer in a modification of the rotary transformer of FIG. 5.

Referring to FIG. 6, a rotary transformer 80 employed in the modification of the second embodiment has write channels wt21 and wt22 and read channels rd21 and rd22 placed in the same arrangement as that in which the channels of the rotary transformer 80 employed in the second embodiment are placed; that is, the channels rd21, wt21, wt22 and rd22 are arranged concentrically in that order. Short rings 200 are embedded in the cores 81 and 82 of the rotary transformer 80 at only a radial position between the first write channel wt21 and the second write channel wt22.

Since the short rings 200 are placed only between the write channels wt21 and wt22 between which no inactive channel exists when both the write channels wt21 and wt22 are active, the magnetic read/write device can be miniaturized and cross talk can be suppressed at any moment during the write operation.

The technical idea of the modification can be applied to the magnetic read/write device in the first embodiment for the same effect. In the magnetic read/write device in the first embodiment, short rings may be placed at a radial position between the adjacent read channels rd11 and rd12.

Although the magnetic read/write devices in the foregoing embodiments and modification are provided with the rotary transformers 80 of an opposed-disk type, respectively, the present invention is not limited thereto; the magnetic read/write devices may be provided with a cylindrical rotary transformer, in which channels are axially arranged along the axis of rotation of the cylindrical rotary transformer.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A magnetic read/write device comprising: a rotary drum; a first write head disposed on the circumference of the rotary drum; a first read head disposed on the circumference of the rotary drum diametrically opposite to the first write head; a second write head disposed on the circumference of the rotary drum angularly behind the first write head with respect to the rotating direction of the rotary drum; a second read head disposed on the circumference of the rotary drum angularly behind the first read head with respect to the rotating direction of the rotary drum and diametrically opposite to the second write head; and a rotary transformer provided with a first write channel for transmitting signals to the first write head, a first read channel for transmitting signals from the first read head, a second read channel for transmitting signals from the second read head, and a second write channel for transmitting signals to the second write head concentrically arranged in that order.

2. The magnetic read/write device according to claim 1, wherein the rotary transformer is provided with magnetic shields only between the first read channel and the second read channel.

3. The magnetic read/write device according to claim 1, wherein a magnetic tape is wrapped around the rotary drum so that the wrapping angle of the magnetic tape is in the range of 90° to 180°.

4. The magnetic read/write device according to claim 1, wherein each of the first write head, the second write head, the first read head and the second read head is provided with a single magnetic gap.

5. The magnetic read/write device according to claim 1, wherein the first write head form first recording tracks on the magnetic tape wrapped around the rotary drum, the second write head forms second recording tracks on the magnetic tape wrapped around the rotary drum, the first read head reads signals written to the first recording tracks, and the second read head reads signals written to the second recording tracks.

6. A magnetic read/write device comprising: a rotary drum; a first write head disposed on the circumference of the rotary drum; a first read head disposed on the circumference of the rotary drum diametrically opposite to the first write head; a second write head disposed on the circumference of the rotary drum angularly behind the first write head with respect to the rotating direction of the rotary drum; a second read head disposed on the circumference of the rotary drum angularly behind the first read head with respect to the rotating direction of the rotary drum and diametrically opposite to the second write head; and a rotary transformer provided with a first read channel for transmitting signals from the first read head, a first write channel for transmitting signals to the first write head, a second write channel for transmitting signals to the second write head, and a second read channel for transmitting signals from the second read head concentrically arranged in that order.

7. The magnetic read/write device according to claim 6, wherein the rotary transformer is provided with magnetic shields only between the first write channel and the second write channel.

8. The magnetic read/write device according to claim 6, wherein a magnetic tape is wrapped around the rotary drum so that the wrapping angle of the magnetic tape is in the range of 90° to 180°.

9. The magnetic read/write device according to claim 6, wherein each of the first write head, the second write head, the first read head and the second read head is provided with a single magnetic gap.

10. The magnetic read/write device according to claim 6, wherein the first write head form first recording tracks on the magnetic tape wrapped around the rotary drum, the second write head forms second recording tracks on the magnetic tape wrapped around the rotary drum, the first read head reads signals written to the first recording tracks, and the second read head reads signals written to the second recording tracks.

\* \* \* \* \*